(No Model.)
A. BURCKARD.
DRIP COFFEE POT.
No. 590,429. Patented Sept. 21, 1897.
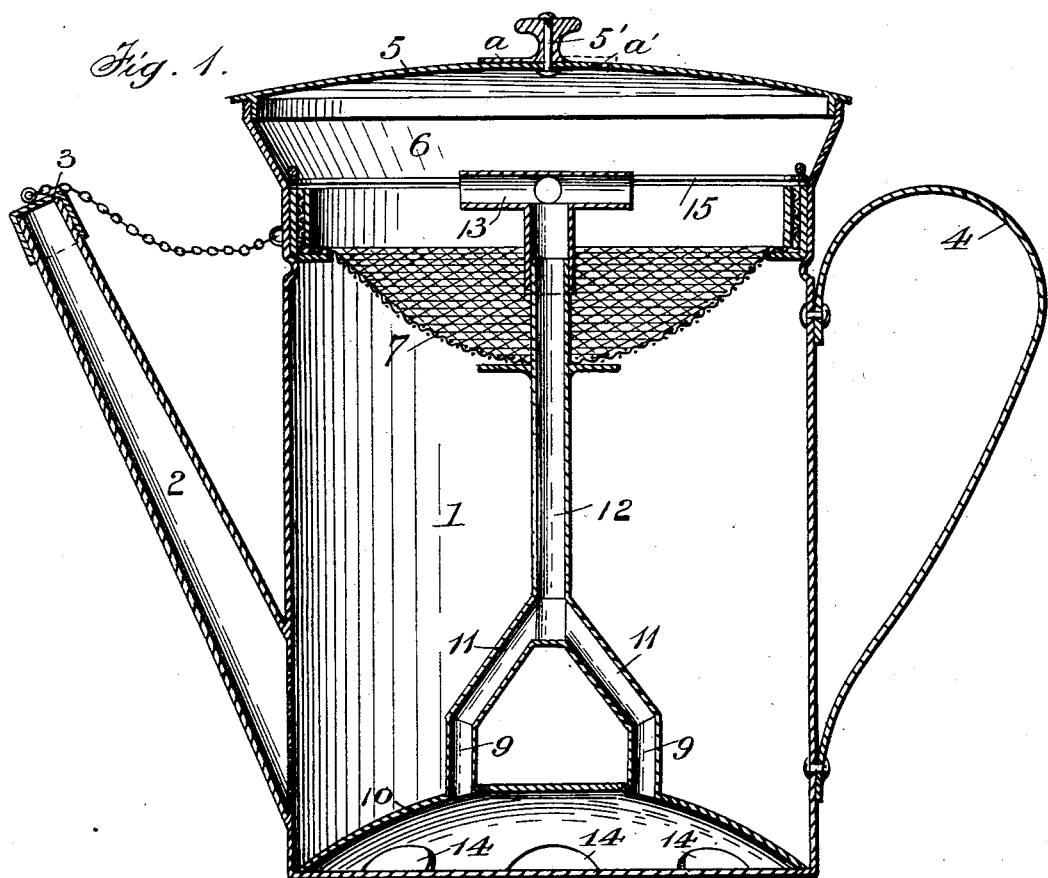
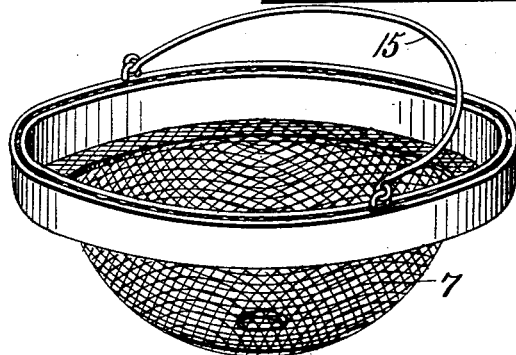
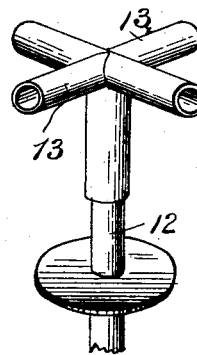
Witnesses
F. L. Ourand
J. T. Smith
Inventor
August Burckard
By H. B. Willson
Attorney

UNITED STATES PATENT OFFICE.

AUGUST BURCKARD, OF BALTIMORE, MARYLAND.

DRIP-COFFEE POT.

SPECIFICATION forming part of Letters Patent No. 590,429, dated September 21, 1897.

Application filed May 18, 1896. Serial No. 592,019. (No model.)

*To all whom it may concern:*

Be it known that I, AUGUST BURCKARD, a citizen of the United States, residing at Baltimore, in the State of Maryland, have invented certain new and useful Improvements in Drip-Coffee Pots; and I do declare the following to be a full, clear, and exact description of the invention, such as will enable others skilled in the art to which it appertains to make and use the same.

My invention has relation to tea or coffee pots, and more particularly to that class employed in making drip-coffee, and the object is to produce a simple, cheap, and convenient device of this kind for household use; and to this end the novelty consists in the construction, combination, and arrangement of the several parts of the same, as will be hereinafter more fully described, and particularly pointed out in the claim.

In the accompanying drawings the same letters and figures of reference indicate the same parts of the invention.

Figure 1 is a vertical section of my improved coffee-pot, and Fig. 2 is a view of the steamer and sieve removed from the pot. Fig. 3 is a detail perspective view of the upper portion of the pipe 12 and its radiating-pipes 13.

1 is a receptacle or reservoir of any suitable size, shape, and dimensions, provided with a spout 2, having a removable air-tight cap or cover 3 and an ordinary handle.

A removable cover 5 fits on the top of the reservoir, and the cylindrical chamber 6 fits inside the mouth of the reservoir as well, so that when the chamber 6 is in place the cover 5 protects the whole and prevents the escape of steam. The knob 5' is pivoted to the cover, and it is provided with a valve *a*, which removably covers a vent *a'* in the cover.

The chamber 6 is provided with a removable conical sieve 7, which forms the bottom of said chamber. Two upright parallel steam-pipes 9 9 are secured to the removable convex bottom 10, and they connect to two inclined pipes 11 11, which are connected at their tops with a single central upright pipe 12, which projects upwardly through the bottom of the removable sieve 7, and its upper end is provided with a removable horizontal cross-pipe 13, which distributes the steam and water radially outward in the chamber 6.

The lower edge of the convex bottom 10 is formed with a series of semicircular recesses 14, which allow the water to flow into the bottom 10 to replace that converted into steam which passes upwardly into the chamber 6.

15 is the folding bail of the removable sieve 7, and it forms the removable bottom of the chamber 6.

In operation a suitable amount of water is first placed in the reservoir and the pulverized coffee is then placed on the sieve 7 in the chamber 6. Finally the cover 5 is placed on the whole and heat applied to the bottom of the reservoir, and as steam begins to form it escapes upwardly through the pipes 9 9 out through the cross-pipe 13, where it is directed upon the coffee in the chamber 6. Here the steam condenses and combines with the soluble elements of the coffee and percolates slowly by gravity through the mass and through the sieve 7 and falls on the outside of the convex bottom 10, where it forms a clear solution or decoction which may be conveniently drawn off for use or allowed to supply the place of the water in the lower bottom 10 and again passed through the mass in the chamber 6 until its virtue is exhausted.

While I have described my improved drip-coffee pot as such, it will readily be understood that any similar substance, such as drugs, may first be ground and then treated as above to extract their medicinal properties in the form of a solution or decoction, which by the continued application of heat can be converted into a fluid extract in the same receptacle, and by simply prolonging the operation a solid aqueous extract can be obtained.

I am aware that heretofore in coffee-pots a central tube has been employed communicating at its lower end with a space between a true and a false bottom, and such single tube when so arranged I do not claim as an element in the combination constituting my invention. The important feature in the combination invented by me is the branching of the central tube 12 into separate pipes 9 11, which branching enables me to produce a result believed to be novel and which on actual trial has been found valuable. This function is the clearing of the tube or maintaining it at all times open for the current passing through it, and this is effected by providing the lower branch pipes in order that should one of them become clogged an upward current is immediately induced by the other branch, which assumes the character of an injector or ejector. Thus should the right-hand pipe 9 or 11 become choked, the uninterrupted current passing up the left-hand pipes of the branch would create a partial vacuum above the obstruction in the choked pipe 9 or 11 and the pressure under the obstruction would cause the pipe to be readily cleared. By such means it has been found possible to maintain a perfect and uninterrupted circulation, which it is believed is not obtainable where the single tube is used.

Having thus fully described my invention, what I claim as new and useful, and desire to secure by Letters Patent of the United States, is—

In a drip-coffee pot, the combination with a reservoir having an annular chamber removably secured in its upper end and provided with a sieve-bottom, of a removable convex bottom having openings in its lower edge, and a pipe having branches communicating with the space between the true and false bottoms of the reservoir, said pipe extending upwardly and having secured thereto above the bottom of the sieve a removable pipe provided with radial branches, the construction and arrangement being such that each branch of the pipe shall aid the other in clearing it of obstructions by producing, through the medium of the current passing through the clear pipe, a partial vacuum in the obstructed pipe above the obstruction, and rendering operative the under pressure, substantially as set forth.

In testimony whereof I hereunto affix my signature in presence of two witnesses.

AUGUST BURCKARD.

Witnesses:
J. A. BRADLEY,
W. G. WALSTON.